(12) United States Patent
Schirmer

(10) Patent No.: US 11,618,602 B1
(45) Date of Patent: Apr. 4, 2023

(54) PROCESS FOR MAKING POUCHES HAVING STRONG TRANSVERSE SHRINKAGE

(71) Applicant: Henry G. Schirmer, Spartanburg, SC (US)

(72) Inventor: Henry G. Schirmer, Spartanburg, SC (US)

(*) Notice: Subject to any disclaimer, the term of this patent is extended or adjusted under 35 U.S.C. 154(b) by 0 days.

(21) Appl. No.: 17/691,929

(22) Filed: Mar. 10, 2022

(51) Int. Cl.

| | | |
|---|---|---|
| *B65B 43/04* | (2006.01) | |
| *B65B 5/04* | (2006.01) | |
| *B31B 70/00* | (2017.01) | |
| *B31B 70/64* | (2017.01) | |
| *B65D 35/08* | (2006.01) | |
| *B32B 1/08* | (2006.01) | |
| *B65B 53/02* | (2006.01) | |
| *B65B 5/02* | (2006.01) | |
| *B65B 61/12* | (2006.01) | |
| *B29C 61/08* | (2006.01) | |
| *B65B 61/02* | (2006.01) | |
| *B31B 155/00* | (2017.01) | |

(52) U.S. Cl.
CPC .............. *B65B 43/04* (2013.01); *B29C 61/08* (2013.01); *B31B 70/001* (2017.08); *B31B 70/645* (2017.08); *B32B 1/08* (2013.01); *B65B 5/022* (2013.01); *B65B 5/045* (2013.01); *B65B 53/02* (2013.01); *B65B 61/02* (2013.01); *B65B 61/12* (2013.01); *B65D 35/08* (2013.01); *B29C 2793/0036* (2013.01); *B31B 2155/003* (2017.08); *B32B 2439/00* (2013.01)

(58) Field of Classification Search
CPC ......... B65D 35/08; B29C 61/08; B29C 55/22; B29C 55/26; B29C 55/28; B29C 2793/0036; B31B 70/001; B31B 70/645; B31B 70/946; B31B 2155/003; B31B 2150/0014; B31B 2170/10; B65B 5/045; B65B 5/022; B65B 43/04; B65B 43/123; B65B 53/02

See application file for complete search history.

(56) References Cited

U.S. PATENT DOCUMENTS

| | | | | |
|---|---|---|---|---|
| 2,409,521 A | * | 10/1946 | Wiley | ..................... B29C 48/00 264/562 |
| 2,488,571 A | * | 11/1949 | Trull | ....................... B29C 48/03 264/564 |
| 2,979,777 A | * | 4/1961 | Goldman | ................ B29C 48/03 425/529 |

(Continued)

FOREIGN PATENT DOCUMENTS

WO   WO-9503929 A1 *   2/1995   .........   B29C 47/0021

*Primary Examiner* — Joshua G Kotis
(74) *Attorney, Agent, or Firm* — Maxwell J. Petersen; FisherBroyles, LLP

(57) ABSTRACT

A process for making a shrink pouch having strong shrink tension in the pouch transverse direction and minimal or no shrink tension in the pouch longitudinal direction is provided. The process includes the steps of reinflating and cold-stretch orienting a previously collapsed blown film and feeding the cold-stretch oriented blown film in a flattened configuration into a side-fed pouch making machine, whereupon the longitudinal direction of the blown film becomes the transverse direction of the pouches thus formed, and vice versa. A shrink pouch having strong transverse shrink tension and little or no longitudinal shrink tension is also provided.

19 Claims, 3 Drawing Sheets

(56) References Cited

U.S. PATENT DOCUMENTS

| | | | |
|---|---|---|---|
| 3,257,489 A * | 6/1966 | Heffolfinger | B29C 55/28 |
| | | | 264/235.6 |
| 3,359,703 A * | 12/1967 | Quaadgras | B65B 9/093 |
| | | | 53/562 |
| 3,567,539 A * | 3/1971 | Schirmer | B32B 27/00 |
| | | | 156/244.14 |
| 3,699,746 A * | 10/1972 | Titchenal | B65B 43/123 |
| | | | 53/384.1 |
| 4,463,861 A * | 8/1984 | Tsubone | B65D 23/0878 |
| | | | 428/318.6 |
| 5,037,683 A | 8/1991 | Schirmer | |
| 5,089,073 A | 2/1992 | Schirmer | |
| 5,158,836 A | 10/1992 | Schirmer et al. | |
| 5,219,666 A | 6/1993 | Schirmer et al. | |
| 5,298,202 A | 3/1994 | Schirmer | |
| 5,456,979 A | 10/1995 | Schirmer | |
| 5,764,607 A | 6/1998 | Maeda et al. | |
| 5,764,608 A | 6/1998 | Satomura | |
| 5,837,335 A | 11/1998 | Babrowicz | |
| 6,196,960 B1 * | 3/2001 | Owensby | B65B 25/065 |
| | | | 383/117 |
| 6,355,287 B2 * | 3/2002 | Noel | B32B 27/08 |
| | | | 426/127 |
| 6,372,274 B2 | 4/2002 | Noel et al. | |
| 6,579,584 B1 | 6/2003 | Compton | |
| 7,200,977 B2 | 4/2007 | Ramesh et al. | |
| 7,517,569 B2 * | 4/2009 | Kreitman | B32B 27/32 |
| | | | 428/36.6 |
| 8,021,049 B2 | 9/2011 | Smith | |
| 10,189,621 B2 | 1/2019 | Dayrit et al. | |
| 11,090,853 B2 * | 8/2021 | Schirmer | B29C 48/335 |
| 11,173,642 B1 * | 11/2021 | Schirmer | B29C 48/266 |
| 11,220,035 B2 * | 1/2022 | Schirmer | B29C 48/08 |
| 11,319,418 B2 * | 5/2022 | Roberto | C08J 7/0427 |
| 2017/0144416 A1 * | 5/2017 | Broadus | B32B 27/325 |
| 2017/0182726 A1 * | 6/2017 | Lips | B65D 3/22 |
| 2017/0297312 A1 * | 10/2017 | Oyama | B65B 53/063 |
| 2019/0134961 A1 * | 5/2019 | Stafyla | B65D 65/40 |

* cited by examiner

PROCESS FOR MAKING POUCHES HAVING STRONG TRANSVERSE SHRINKAGE

FIELD OF THE INVENTION

This present invention is directed to a process for making multilayer polymeric shrink pouches having strong shrink properties in the pouch transverse direction and minimal or no shrink properties in the pouch longitudinal direction.

BACKGROUND OF THE INVENTION

Conventional multilayer polymer films have minimal or no orientation in the longitudinal and transverse directions of the blown film bubble and, consequently, exhibit little or no heat shrinkage. The blown film process can be manipulated to achieve some shrink properties by selecting appropriate polymers and processing conditions to achieve higher melt viscosity. This can be accomplished, for example, by using polymers with higher molecular weight and/or melt temperature, and/or by reducing the extrusion temperature. Using such optimization techniques, blown films have been obtained which exhibit up to 50% shrink in either or both of the longitudinal and transverse directions. Even when such shrink properties are achieved, the shrink tension of the blown films and pouches made from them is typically less than about 50 psi in any direction. These shrink films and pouches are considered to possess "soft shrink," which is suitable for packaging soft objects such as pillows or tissue paper. Many applications, including but not limited to food and medical packaging, would benefit from pouches having higher shrink tension in the transverse direction.

Attempts have been made to post-orient blown film in both the longitudinal and transverse directions by re-inflating the blown film bubble after collapsing it and stretching the reinflated bubble between first and second pairs of heated nip rollers, where the second pair of nip rollers turns at a faster speed than the first pair. Such a hot orientation process, which includes application of considerable external heat, is described in U.S. Pat. No. 6,372,274 to Noel et al., and U.S. Pat. No. 6,579,584 to Compton. While these processes have shown some success in biaxially orienting the blown film, there is still a need or desire for heat shrinkable pouches that exhibit strong shrink tension in the transverse direction of the pouch and minimal or no shrink tension in the longitudinal direction of the pouch. Each manufactured pouch is generally filled with food or medical product or another item from an open end, after which air is withdrawn, and the open end is closed and sealed. There is essentially no need to have strong shrink in the loading direction of the pouch, which is conventionally the longitudinal direction of the blown film and the direction where orientation is easiest to achieve. Instead, there is a need or desire for strong gripping of the enclosed product in the transverse direction of the pouch.

SUMMARY OF THE INVENTION

The present invention is directed to a process for making pouches having strong shrink tension in the transverse direction of the pouch, and minimal or no shrink in the longitudinal direction of the pouch. As used herein, the term "pouch" refers to any multilayer polymer pouch, casing or bag that is used to package food, medical devices and products, hardware, software, electronic parts, household products, tissue, and any other product that is intended to be enclosed on all sides by a shrink film. The term "pouch transverse direction" refers to the direction perpendicular to and extending between two side edges of the pouch. The term "pouch longitudinal direction" refers to the direction perpendicular to and extending between an initially open top of the pouch (to be closed and sealed after the pouch is filled) and a closed bottom of the pouch. The term "shrink tension" refers to a potential shrinking force impacted to the shrink pouch in a stated direction (longitudinal or transverse) during stretch orientation of the pouch. When the pouch is filled with a product and heated to a high enough temperature to cause shrinkage, the shrink tension is activated so that the shrink film tightly surrounds and encloses the packaged product. Shrink tension can be measured using ASTM D2838-18, which is incorporated by reference.

The process of the invention includes three stages. In the first stage, a multilayer blown film is produced as a tubular blown film bubble, using a blown film coextrusion line, and the blown film bubble is collapsed between two nip rollers to a flattened configuration. The tubular blown film bubble is produced and collapsed with little or no stretching force in the longitudinal or transverse direction of the blown film, and little or no orientation is performed in the first stage. The flattened blown film is either unoriented or has minimal orientation.

In the second stage, the flattened blown film is reinflated between first and second pairs of nip rollers and stretched in the longitudinal (traveling) direction of the film while maintaining a substantially constant dimension in the transverse direction of the film (perpendicular to the traveling direction). The longitudinal stretching can be performed using cold stretching and can increase the longitudinal dimension of the blown film by about 50 percent to about 600 percent, suitably by about 100 to about 500 percent, while limiting or restraining any stretching or contraction in the transverse direction to less than about 10 percent, suitably less than about 6 percent. The term "cold stretching" refers to stretching between a first set of nip rollers having a first surface speed and a second set of nip rollers having a second surface speed that is greater than the first surface speed, where no internal or other extraneous heat is applied to either set of nip rollers beyond the heat that is imparted by the film being stretched. The film can optionally be preheated prior to contacting the first set of nip rollers by passing it through a fluid bath. Regardless of whether or not the film is preheated, the molecular orientation that occurs during cold stretching can generate significant additional heat. The cold stretching can be sufficient to impart a shrink tension of at least about 300 psi in the longitudinal direction of the film while limiting the shrink tension to zero to less than about 150 psi in the transverse direction of the film.

The stretch oriented blown film is again collapsed to its flat configuration in the second set of nip rollers. In the third stage, the flattened stretch oriented film is longitudinally fed into one side of a pouch making apparatus that is configured for side feeding. The pouch making apparatus is configured so that the longitudinal direction of the flattened stretch oriented blown film being fed to the apparatus corresponds to the transverse direction of the pouches being made, and the transverse direction of the flattened stretch oriented blown film corresponds to the longitudinal direction of the pouches being made. Upon entering the pouch making apparatus, one side edge of the flattened stretch oriented blown film is slit in order to provide open top ends of the pouches. The flattened stretch oriented film is heat sealed in its transverse direction at predetermined longitudinal intervals to provide seals defining side edges of the individual pouches, and the seals are perforated to enable separation of adjacent pouches from each other. The pouches thus formed have a shrink tension of at least about 300 psi in the pouch transverse direction and zero to less than about 150 psi in the pouch longitudinal direction.

With the foregoing in mind, one embodiment of the invention is directed to a process of making transverse shrink pouches that includes the following steps:

providing a tubular polymeric blown film having a flattened configuration, an annular configuration, first and second side edges in the flattened configuration, and including multiple polymer layers;

inflating the tubular polymeric blown film from the flattened configuration to the annular configuration between a first set of nip rollers and a second set of nip rollers;

cold stretch orienting the tubular polymeric blown film in a longitudinal direction by about 50 percent to about 600 percent between the first set of nip rollers and the second set of nip rollers, while limiting stretching or contraction of the tubular polymeric blown film in a transverse direction to less than about 10 percent, to form a stretch oriented tubular polymeric blown film;

collapsing the stretch oriented tubular polymeric blown film from the tubular configuration to the flattened configuration using the second set of nip rollers;

imparting a plurality of transversely extending perforated seals between the first side edge and the second side edge at predetermined intervals along a length of the stretch oriented tubular polymeric film;

continuously slitting the stretch oriented blown film in the flattened configuration along the first side edge but not along the second side edge, either before or after the transversely extending perforated seals are imparted, to form individual pouches having an open end corresponding to the first side edge, a closed end corresponding to the second side edge, and opposing sealed pouch edges;

wherein the individual pouches have a pouch transverse direction extending between the sealed pouch edges, a pouch longitudinal direction extending between the top end and the bottom end, a shrink tension of at least about 300 psi in the pouch transverse direction, and a shrink tension of zero to less than about 150 psi in the pouch longitudinal direction.

Another embodiment of the invention is directed to a process of making transverse shrink pouches that includes the following steps:

providing a tubular polymeric blown film having a flattened configuration, an annular configuration, first and second side edges in the flattened configuration, and including multiple polymer layers;

cold stretch orienting the tubular polymeric blown film in a longitudinal direction by about 100 percent to about 500 percent between the first set of nip rollers and the second set of nip rollers, while limiting stretching or contraction of the tubular polymeric blown film in a transverse direction to less than about 8 percent, to form a stretch oriented tubular polymeric blown film;

collapsing the stretch oriented tubular polymeric blown film from the tubular configuration to the flattened configuration using the second set of nip rollers;

imparting a plurality of transversely extending perforated seals between the first side edge and the second side edge at predetermined intervals along a length of the stretch oriented tubular polymeric film;

continuously slitting the stretch oriented blown film in the flattened configuration along the first side edge but not along the second side edge, either before or after the transversely extending perforated seals are imparted, to form individual pouches having an open end corresponding to the first side edge, a closed end corresponding to the second side edge, and opposing sealed pouch edges;

wherein the individual pouches have a pouch transverse direction extending between the sealed pouch edges, a pouch longitudinal direction extending between the top end and the bottom end, a shrink tension of at least about 300 psi in the pouch transverse direction, and a shrink tension of zero to less than about 100 psi in the pouch longitudinal direction.

Another embodiment of the invention is directed to a transversely heat shrinkable pouch that includes the following features:

A transversely heat shrinkable pouch, having a top end that is open or sealed, a bottom end that is closed but not sealed, and two opposing side edges that are defined by longitudinal seals that extend between the top end and the bottom end, a pouch longitudinal direction that is perpendicular to the top end and the bottom end, and a pouch transverse direction that is perpendicular to the two opposing side edges;

wherein the transversely heat shrinkable pouch has a shrink tension of at least about 300 psi in the pouch transverse direction and a shrink tension of zero to less than about 150 psi in the pouch longitudinal direction.

The foregoing and other features and advantages will become further apparent from the following detailed description, read in conjunction with the accompanying drawings.

DETAILED DESCRIPTION OF THE INVENTION

The detailed description that follows includes exemplary descriptions of the three stages of the process, namely a) providing a tubular polymeric blown film having a flattened configuration, an annular configuration, first and second side edges in the flattened configuration, and multiple polymer layers, b) reinflating and stretch orienting the tubular polymeric blown film in the longitudinal direction of the film while limiting or restraining dimensional change in the transverse direction of the film, and collapsing the stretch oriented blown film back to its flattened configuration, and c) processing the stretch oriented blown film in a side-fed pouch making apparatus, thereby forming pouches having a pouch transverse direction corresponding to the longitudinal direction of the stretch oriented blown film and a pouch longitudinal direction corresponding to the transverse direction of the stretch-oriented blown film, wherein the pouches have a shrink tension of at least about 300 psi in the pouch transverse direction and less than about 150 psi in the pouch longitudinal direction.

Figure 1:
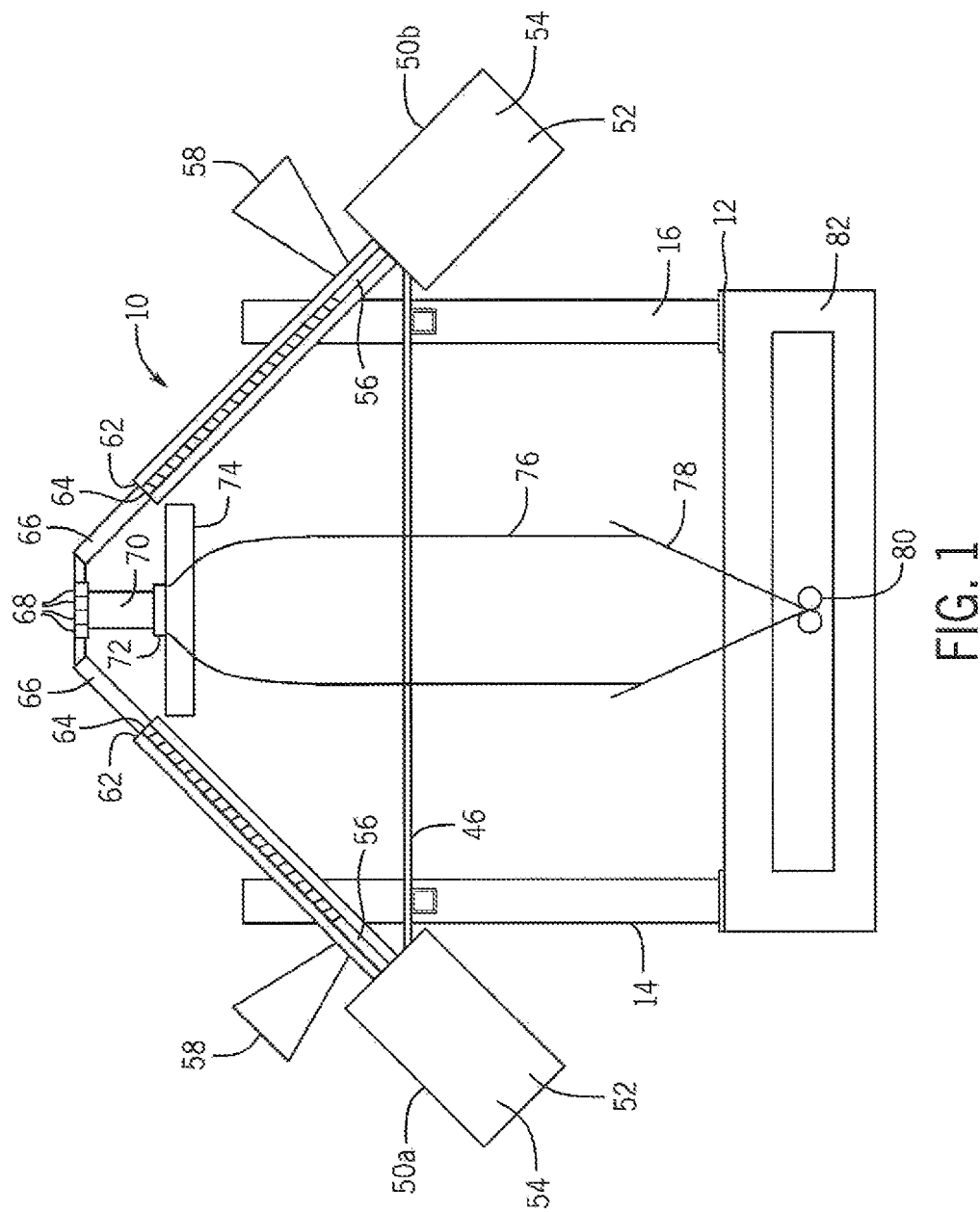
FIG. 1 schematically illustrates a front view one embodiment of a blown film coextrusion line that can be used to provide a tubular polymeric blown film having multiple polymer layers.
Figure 2:
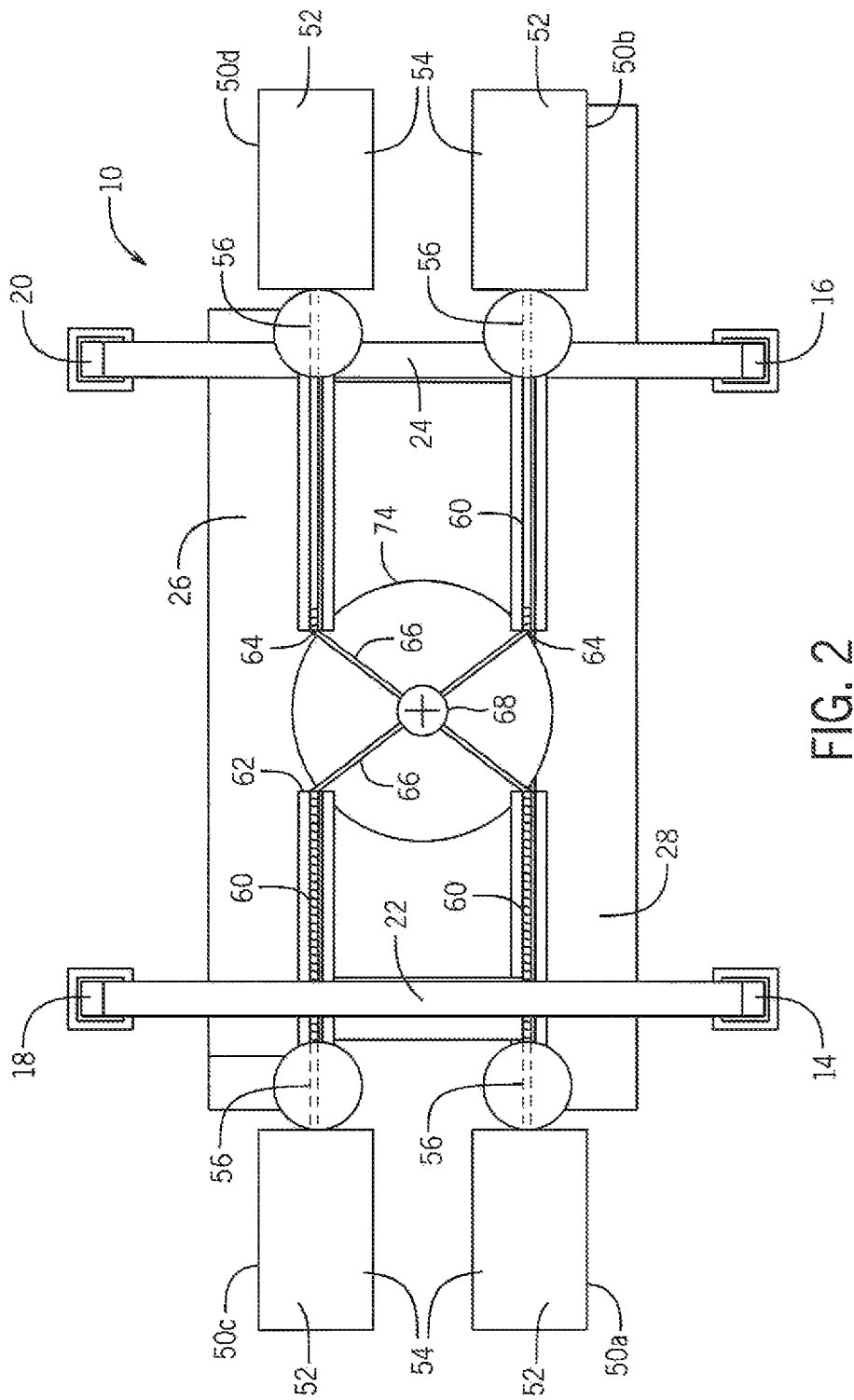
FIG. 2 schematically illustrates a top view of the blown film coextrusion line of FIG. 1.

The multilayer tubular polymeric blown film can be formed using a wide variety of processes and is not limited to the exemplary process described herein. FIGS. 1 and 2 show one embodiment of a blown film coextrusion line that is further described in U.S. Pat. No. 11,173,642, issued to Schirmer et al., which is incorporated by reference. Referring to FIGS. 1 and 2, an exemplary blown film coextrusion line 10 includes a support frame 12 that includes upright support elements 14, 16, 18 and 20, lateral support elements 22 and 24, and longitudinal support elements 26 and 28. Each of the lateral support elements is joined to at least two of the upright support elements. Each of the longitudinal support elements extends between and is joined to at least two of the lateral support elements. The support frame 12 can also include a plurality of mounting pads 30, 32, 34 and 36 which can be connected to the first and second lateral support elements 22 and 24 and can be pivotally connected to the lateral support elements to enable posturing of extruders at different angles.

The lateral and longitudinal support elements 22, 24, 26 and 28 define a movable platform 46 that can be moved vertically relative to the upright support elements 14, 16, 18 and 20. The entire platform 46 can be vertically elevated or lowered, carrying the extruders and blown film die that are supported by the platform 46. Four extruders 50a, 50b, 50c and 50d (collectively "50") are securely mounted to the support frame 12, suitably via mounting pads (not shown) which in turn are connected to the first and second lateral support elements 22 and 24 of the support frame 12. Each of the extruders can include a drive motor 52 at its proximal end 54, which can be a torque drive motor. Each of the extruders can also include a feed section 56 into which polymer is fed through a hopper 58, an extrusion section 60, and a distal end 62 defining an exit 64. Each distal end 62 can be connected to a feed line 66 that is in turn connected to and feeds a respective individual inlet 68 of a downward facing blown film coextrusion die 70. In one embodiment, the blown film coextrusion die 70 can have twelve or more separate inlets 68 arranged around the circumference of a thin annular feeding disk as described in U.S. Pat. Nos. 11,090,853 and 11,220,035, both issued to Schirmer, the disclosures of which are incorporated by reference, and each of the polymer inlets 68 can produce several nanolayer film layers as described in the patents.

The four extruders 50a, 50b, 50c and 50d can be positioned at acute angles relative to horizontal. This enables the distal end 62 of each extruder to feed polymer into the blown film coextrusion die 70 while the proximal end 54 of each extruder can be positioned on or below the opposing first and second lateral support elements 22 and 24 of the support frame 12. The blown film coextrusion die 70 includes an end plate 72 resting above an air ring 74 and is supported by the hanging connections provided by the feed lines 66 extending from the four extruders, and by the movable platform 46. By surrounding and sandwiching the blown film coextrusion die 70 between the extruders 50a, 50b, 50c and 50d, the feed lines 66 and the platform 46, the blown film coextrusion die 70 can be maintained in a stable position without requiring the use of a tower and produces a stable bubble 76 that can be ultimately collapsed upon entering collapsing frame 78, passed between nip rollers 80 located at or near the base 82 of support frame 12, and wound and stored as a flat film. The downward facing blown film coextrusion die 70 can have a variety of die configurations, including without limitation the modular disk coextrusion dies with opposing disk arrangements described in U.S. Pat. Nos. 11,090,853 and 11,220,035, both issued to Schirmer, the disclosures of which are incorporated herein by reference. These and other modular disk coextrusion die employ suitable arrangements of thin annular disks to produce a wide variety of blown film structures, including nanolayer blown film structures having unique barrier properties and other physical characteristics.

Figure 3:
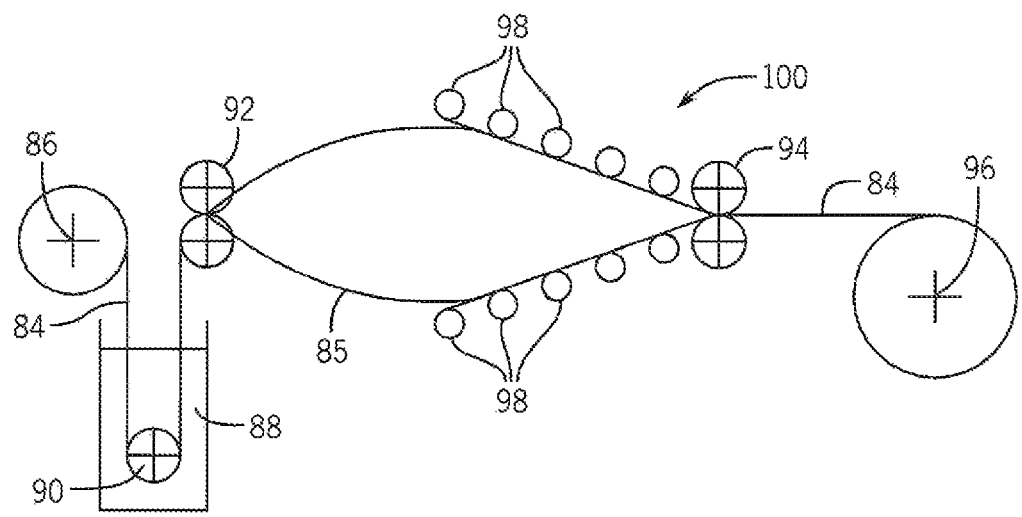
FIG. 3 is a side schematic view of a reinflation and stretch orienting process that can be used to cold stretch a coextruded multilayer blown film in the longitudinal direction of the film, while limiting or restraining stretching or contraction in the transverse direction of the film.

FIG. 3 schematically illustrates a side view of an exemplary cold stretching process and apparatus 100 for stretch orienting the tubular blown film in the longitudinal direction of the film while limiting or restraining dimensional change (either widening or narrowing) in the transverse direction of the film. The tubular blown film 84, in its flattened configuration, is unwound from a storage roll 86 and can optionally be preheated by passing it through a heated fluid bath 88 and around a submerged guide roller 90. The storage roll 86 is not needed if the stretch orienting process 100 shown in FIG. 3 is combined with the blown film coextrusion process 10 shown in FIGS. 1 and 2 as a continuous integrated process. One feature of the stretching process 100 is to limit the amount of extraneous heat imparted to the blown film 84 during stretching, in order to maximize the amount of shrink tension imparted during the stretch orientation of the blown film 84. While the stretch orientation of the blown film generates considerable heat even without external heating, minimizing the amount of extraneous heat increases the amount of kinetic energy or force required to stretch orient the film, which in turn increases the shrink tension of the stretch oriented film after it is cooled. For this reason, it may be desirable to only perform the preheating using the heated fluid bath 88 when it is necessary to facilitate cold stretching between the first and second pairs of nip rollers 92 and 94, described below.

The need for a heated fluid bath 88 may depend on the polymer composition of the blown film 84, to the extent that certain polymers used in the film layers may require some preheating in order to achieve the stretch orientation. When the preheating step is used, the amount of preheat applied can be the minimum amount needed to enable the stretch orientation to occur. For example, if the heated fluid bath 88 contains water, the water temperature can vary between about 30° C. and about 95° C., whereupon shrink tension in the oriented film can be increased by using the least amount of preheat that is needed for the subsequent cold stretching.

With or without the preheating step, the flattened tubular film 84 can then be reinflated and cold stretch oriented between a first set of nip rollers 92 having a first surface velocity and a second pair of nip rollers 94 having a second surface velocity that is higher than the first surface velocity. The second surface velocity can be about 50 percent to about 600 percent greater than the first surface velocity, or about 100 percent to about 500 percent greater than the first surface velocity. The cold stretching is used to stretch orient the blown film 84 in its longitudinal direction by about 50 percent to about 600 percent, or about 100 percent to about 500 percent of its initial length. As explained above, an objective of the cold stretching is to not only control the amount of stretch orientation (which influences the amount of potential shrink) but to also increase the amount of shrink tension in the pouch transverse direction while minimizing the shrink tension in the pouch longitudinal (loading) direction. To this end, the blown film 84 can suitably be "cold-stretched" between the first set of nip rollers 92 and the second pair of nip rollers 94, whereupon the increased stretching force needed for cold stretching imparts an increased shrink tension to the resulting stretch oriented film. For purposes of this application, the term "cold-stretching" means that no internal or other extraneous heat, beyond the heat applied by the blown film 84, is applied to the first set of nip rollers 92 or the second set of nip rollers 94. For example, the first set of nip rollers 92 and the second set of nip rollers 94 are not heated internally by steam or other means and no radiation or other extraneous heat is applied to the nip rollers or the film 84 while the film is being reinflated and stretch oriented between the nip rollers. It is understood that the cold stretching itself can cause the blown film 84 to become hot, and some of that heat will be transmitted to the nip rollers under equilibrium conditions.

The stretching conditions (including the amount of reinflation, the speed of the first and second sets of nip rollers, and the preheat if any) should be adjusted to impart a shrink tension in the longitudinal direction of blown film 84 (corresponding to the transverse direction of the pouches then made) of at least about 300 psi, or at least about 350 psi, or at least about 400 psi, or at least about 450 psi, or at least about 500 psi, and up to about 1000 psi, or up to about 900 psi, or up to about 800 psi, while restraining or limiting the dimensional change in the transverse direction of the blown film 84 (corresponding to the longitudinal direction of the pouches the made) as explained below. While the first and second sets of nip rollers 92 and 94 should be free of internal or other extraneous heat, they can optionally be cooled using internal cooling water, air, or another fluid, in order to remove some of the heat generated by the cold stretching of the blown film 84. The amount of shrink tension in the longitudinal direction of blown film 84 can be optimized by minimizing the amount of heat applied during cold-stretch orienting of the blown film 84. After reinflation and stretching, the stretch oriented blown film 84 is collapsed to its flat state in the second set of nip rollers 94 and can then be wound around another storage roll 96.

Another objective of the cold stretching process 100 is to minimize the amount of stretch orientation or other dimensional change (i.e., contraction) of the blown film 84 in the transverse direction of the film, and thus control or minimize the amount of shrink tension of the blown film 84 in its transverse direction to a much lower level that the amount of shrink tension that is imparted in its longitudinal direction. This can be accomplished by controlling (i.e., minimizing) the amount of reinflation of the blown film bubble 85 so that the reinflation itself does not cause significant transverse direction orientation. Additionally, the stretch orientation process 100 can be equipped with a plurality of guide rollers 98 on both sides of the reinflated blown film bubble 85. In FIG. 3, a total of ten guide rollers 98 are illustrated, including five guide rollers on both sides of the reinflated blown film bubble 85. The guide rollers 98 grasp the reinflated blown film bubble 85 with just enough surface friction to limit any dimensional change in the transverse direction, while simultaneously compressing the reinflated blown film bubble 85 in a controlled fashion until it reaches the second set of nip rollers 94. By controlling the degree of inflation of the reinflated bubble 85, the nip roll surface velocities, and with the aid of guide rollers 98, any dimensional change in the transverse direction of the blown film bubble 84 can be contained to within zero to less about 10 percent, suitably zero to less than about 8 percent, or zero to less than about 6 percent, or zero to less than about 4 percent, whether by stretching or contraction in the transverse direction. This means that the flattened blown film bubble 84 after passing the second set of nip rollers 94 has a transverse width within zero to less than about 10 percent, suitably within zero to less than about 8 percent, or zero to less than about 6 percent, or zero to less than about 4 percent, compared to the transverse width of the flattened blown film bubble 84 before entering the first set of nip rollers 92, while the length of the flattened blown film bubble 84 in the longitudinal direction has been increased by about 50 to about 600 percent, suitably by about 100 to about 500 percent, due to the cold-stretch orienting between the first set of nip rollers 92 and the second set of nip rollers 94.

Due to the nature of cold-stretch orientation imparting relatively high shrink tension, even relatively minor transverse direction orientation of less than about 10 percent can impart some transverse direction shrink tension to the flattened blown film bubble 84. By controlling the transverse direction orientation (if any) to less than about 10 percent, suitably less than about 8 percent, or zero to less than about 6 percent, or zero to less than about 4 percent, the transverse direction shrink tension of flattened blown film bubble 84 can be controlled to between zero to less than about 150 psi, suitably zero to less than about 100 psi, or zero to less than about 50 psi, or zero to less than about 40 psi, or zero to less than about 30 psi, or zero to less than about 20 psi. After leaving the second set of nip rollers 94, the flattened cold-stretch oriented blown film bubble 84 having the desired strong longitudinal shrink tension and the desired minimal transverse direction shrink tension can be cooled or allowed to cool and wound on storage roll 96. For example, the cold-stretch oriented flattened blown film bubble 84 can be cooled after leaving the second set of nip rollers 94 using an air stream, a water spray, of another suitable cooling device.

Figure 4:
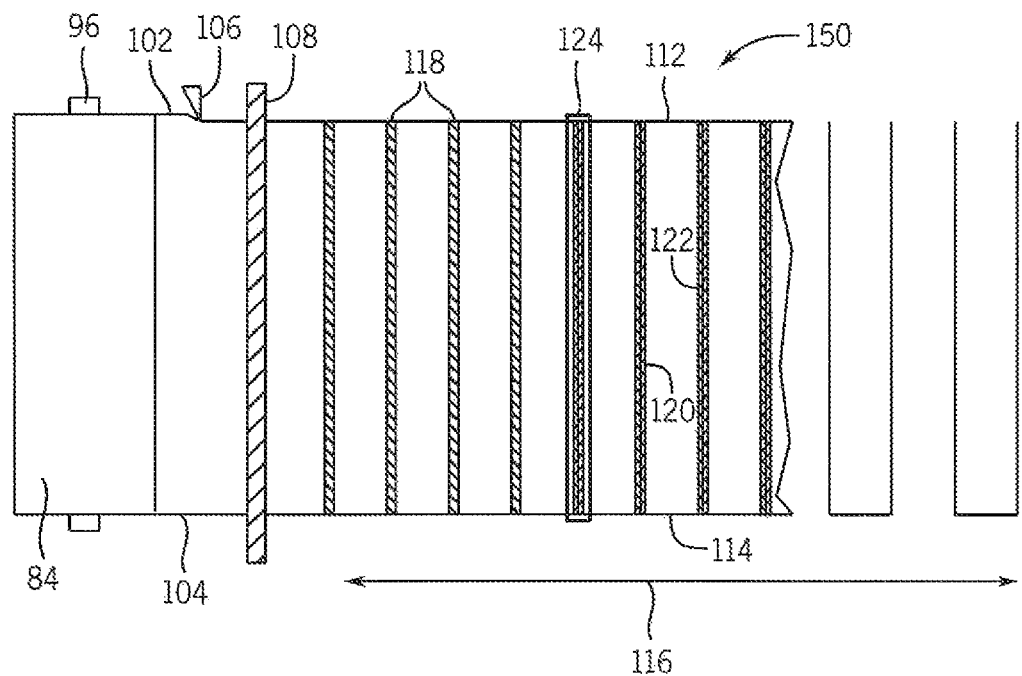
FIG. 4 schematically illustrates a top view of a side-fed pouch making apparatus that can be used to make transversely shrinkable pouches having strong transverse shrink tension using the stretch oriented blown film produced, for example, using the process of FIG. 3.

FIG. 4 schematically illustrates a top view of a side-fed pouch making process and apparatus 150 that can be used to make transversely shrinkable pouches having strong transverse shrink tension using the flattened cold-stretch oriented blown film 84 produced in the exemplary process 100 of FIG. 3 or another suitable process. Again, the pouch making process 150 of FIG. 4 can be combined with the stretch orientation process 100 of FIG. 3 as a single continuous process, or the processes 100 and 150 can be performed separately. If the processes 100 and 150 of FIGS. 3 and 4 are integrated, then the intervening storage roll 96 can be eliminated.

Referring to FIG. 4, the flattened cold-stretch oriented blown film 84 can be unwound from storage roll 96 and side-fed into the pouch-making apparatus 150 so that the first side edge 102 of the flattened blown film 84 corresponds to a top end 112 of the pouches 110 being made and the second side edge 104 of the flattened blown film 84 corresponds to the bottom end 114 of the pouches 110. As the stretch-oriented flattened blown film 84 progresses into the pouch making apparatus 150, a small portion of the first side edge 102 can be removed using a knife 106 or other cutting device to create an open top end 112 in the individual pouches 110, whereupon the bottom end 114 of the individual pouches 110 remains closed as defined by the folded second side edge 104 of the flattened blown film 84. As the flattened oriented blown film 84 enters and progresses through the pouch making machine 150, the flattened cold-stretch oriented blown film 84 remains under high shrink tension in the longitudinal direction of the flattened cold-stretch oriented blown film 84, which corresponds to the transverse direction of the individual pouches 110, as defined by the arrow 116. The individual pouches 110 thus formed possess the same high shrink tension in the pouch transverse direction that was previously imparted in the longitudinal direction of the flattened cold-stretch oriented blown film 84 and the same minimal shrink tension in the pouch longitudinal direction that was previously imparted in the transverse direction of the flattened cold-stretch oriented blown film 84.

As the flattened stretch oriented blown film 84 progresses further into the pouch making apparatus, a heat sealing bar 108 is used to impart intermittently spaced heat seals 118 in the transverse direction of the flattened blown film 84, which corresponds to the longitudinal direction of the individual pouches 110. The heat seals ultimately serve to provide closed side edges 120 and 122 to the individual pouches 110. Further into the pouch making apparatus 150, the heat seals 118 can be longitudinally perforated right down their middle using a cutting or perforation device 124, thereby enabling easy separation of the individual pouches 110 from each other. In varying embodiments of the invention, the slitting using knife 106 can occur either before or after the heat sealing using heat sealing bar 108 and the perforating using perforation device 124. It is not required that these steps be performed in the order that is illustrated in FIG. 4.

The pouches 110 thus formed can have a shrink tension in the pouch transverse direction (between side edges 120 and 122 and corresponding to the longitudinal direction of cold-stretch oriented flattened blown film 84) of at least about 300 psi, or at least about 350 psi, or at least about 400 psi, or at least about 450 psi, or at least about 500 psi, and in some embodiments, up to about 1000 psi, or up to about 900 psi, or up to about 800 psi. The pouches 110 can have a shrink tension in the pouch longitudinal direction (between top and bottom ends 112 and 114 and corresponding to the transverse direction of cold-stretch oriented flattened blown film 84) of zero to less than about 150 psi, or zero to less than about 100 psi, or zero to less than about 50 psi, or zero to less than about 40 psi, or zero to less than about 30 psi, or zero to less than about 20 psi. The illustrated pouches 110 have narrow widths relative to their longitudinal height. In varying embodiments, the pouches 110 can be made wider or narrower by increasing the distance between the heat seals 118 and can be made shorter or taller by varying the width of the cold-stretch oriented flattened blown film bubble 84 used to form the pouches.

The individual pouches 110 can be filled with a product either before or after being separated from each other. Once filled, the open top end 112 of the pouches 110 can be sealed shut by heat sealing or another suitable technique. Prior to closing the top ends 112, the pouches 110 can be passed through a vacuum chamber to remove as much air as possible. The closing of the top ends 112 can suitably take place while the pouches 110 are under vacuum. The filled and closed pouches 110 can then be heated to a shrinkage temperature of the multilayer polymer film, whereupon the pouches exhibit strong shrink force in the pouch transverse direction, corresponding to the previously stored shrink tension, to tightly hug and seal the enclosed product. The pouches 110 will exhibit much less and possibly no shrink force in the pouch machine direction, corresponding to the previously stored shrink tension, if any, in the pouch machine direction.

A wide variety of polymers and layer combinations can be used to make the shrink pouches having strong transverse direction shrinkage. When high transparency and high barrier properties are desired, the cold-stretch oriented blown film and resulting pouches can include first and second outer layers formed using a transparent amorphous polymer; an inner nanolayer sequence including a plurality of nanolayers a) including ethylene vinyl alcohol, alternating with a plurality of nanolayers b) including at least one of ethylene ethyl acrylate, ethylene acrylic acid, low density polyethylene and linear low density polyethylene, each of the nanolayers b) having a degree of crystallinity less than about 45%; and adhesive layers between each of the first and second outer layers and the inner nanolayer sequence; where the resulting cold-stretch oriented blown film and pouches can have a light transmittance of at least about 80%, or at least about 84%, or at least about 88%, measured using ASTM D1746. The term "nanolayers" refers to film layers having thicknesses in the submicron range, typically between about 1 to about 999 nanometers, or about 10 to about 500 nanometers. The term "microlayers" refers to layers having thicknesses of about 1 to about 999 microns, or about 5 to about 500 microns, or about 10 to about 100 microns.

The outer layers can be formed using polyethylene terephthalate glycol (PETG) as one or both of the outer layers. PETG is both highly transparent and has excellent heat seal properties. Additional amorphous polymers that can be used in the outer layers include without limitation polystyrene, polystyrene copolymers, polycarbonate, amorphous acrylic polymers and copolymers, and combinations thereof, which are selected to have a light transmittance of at least about 80%, or at least about 84%, or at least about 88%.

The inner nanolayer sequence contributes gas barrier properties and some moisture barrier and the layers b) can have the lowest practical crystallinity (less than about 45%, less than about 40%, less than about 35%, less than about 30%, less than about 25%, or less than about 20%, measured using ASTM D1505), in order to contribute the highest possible transparency to the overall film. The layers b) adhere to the alternating layers a) of ethylene vinyl alcohol and protect them from water absorption which would compromise their gas barrier properties. In order to provide optimal adhesion and transparency, the layers b) can include blends of EEA or EAA with an anhydride-grafted polyethylene, for example, a modified polyethylene sold under the name PLEXAR®. Such adhesive blends can include from about 10% to about 90% by weight EEA or EAA and about 10% to about 90% by weight anhydride-modified polyethylene, or about 25% to about 75% by weight EEA or EAA and about 25% to about 75% by weight anhydride-modified polyethylene, or about 40% to about 60% by weight EEA or EAA and about 40% to about 60% by weight anhydride-modified polyethylene, or about 50% by weight EEA or EAA and about 50% by weight anhydride-modified polyethylene.

The inner nanolayer sequence can include a number "x" of repeating units of alternating layers a) and b), where "x" can be at least 3, or at least 4, or at least 5, or at least 6, or at least 7, or at least 8, or at least 9, or at least 10, or at least 15, or at least 20, or at least 25, or at least 30, or at least 35, or at least 40, or at least 45, or at least 50.

In another embodiment, the high-transparency cold-stretch oriented blown film can also include an additional inner moisture barrier layer of layer combination that provides the shrink pouches with overall excellent moisture barrier properties, as well as structural integrity. In order to preserve film clarity, the moisture barrier layer or layer combination can include a first low density polyethylene or linear low density polyethylene having low crystallinity, suitably less than about 45%, or less than about 40%, and/or in a range of about 35% to about 40%, measured using ASTM D1505. The low density or linear low density polyethylene can have a density of about 0.910 to about 0.925 grams/cm$^3$ and can be present as moisture barrier nanolayers. In one embodiment, the nanolayers formed of the first low density or linear low density polyethylene can alternate with nanolayers formed of a second low density or linear low density polyethylene. The second low density polyethylene or linear low density polyethylene can also have low crystallinity, suitably less than about 45%, or less than about 40%, and/or in a range of about 35% to about 40%, measured using ASTM D1505. The second low density or linear low density polyethylene can have a density of about 0.910 to about 0.925 grams/cm$^3$. The alternating nanolayers of first and second low crystallinity low density or linear low density polyethylene further contribute high transparency to the multilayer coextruded barrier film, along with moisture barrier, strength, and integrity.

In one embodiment, the above-described moisture barrier combination can include a number "y" of repeating units of alternating layers of the aforementioned first and second polyethylene, where "y" can be at least 3, or at least 4, or at least 5, or at least 6, or at least 7, or at least 8, or at least 9, or at least 10, or at least 15, or at least 20, or at least 25, or at least 30, or at least 35, or at least 40, or at least 45, or at least 50. The moisture barrier layer combination can be adjacent to the primarily gas barrier combination, and both of them can be sandwiched in between the transparent amorphous outer layers.

Additional cold-stretch oriented blown film structures and pouches can be made using the modular disk coextrusion die having the opposing disk arrangement, as described in U.S. Pat. No. 11,173,642 and U.S. Patent 110090,853 and U.S. Pat. No. 11,220,035, both issued to Schirmer et al., the disclosures of which are incorporated by reference. These films can include nanolayers. for example, the films can include at least about 80% nanolayers based on the total number of film layers, or at least about 90% nanolayers, or at least about 95% nanolayers, or at least about 99% nanolayers, or about 100% nanolayers. In varying embodiments, the multilayer nanolayer blown films may have at least about 25 nanolayers, or at least about 50 nanolayers, or at least about 75 nanolayers, or at least about 100 nanolayers, or at least about 150 nanolayers, or at least about 200 nanolayers, or at least about 250 nanolayers, or at least about 300 nanolayers. The multilayer nanolayer blown films can utilize up at about 12, or up to about 16, or up to about 20, or up to about 24 polymer melt streams provided using an appropriate number of extruders. The melt streams can have the same, different, and/or a combination of the same and different polymer compositions.

Barrier films containing various layer combinations of polyethylene terephthalate glycol (PETG) ethylene acrylic acid (EAA), low-density or linear low density polyethylene (LDPE or LLDPE) and ethylene-vinyl alcohol (EVOH) have been found to exhibit excellent transparency and can be cold-stretch oriented to provide pouches having strong shrink tension in the pouch transverse direction. Similar film combinations made using nylon-6 instead of or in addition to EVOH can be cold-stretch oriented to produce pouches having high transparency as well as strong transverse shrink tension at tailored layer thicknesses. Other polyester copolymers cam also be used in place of or in addition to the PETG, including without limitation polyethylene terephthalate-1,4-cyclohexane-2 methyl ester, polyester-polyether block copolymers, and combinations thereof.

In addition to or in place of EVOH, examples of alternative oxygen barrier polymers include without limitation polyamides, polyketones, polyvinyl chlorides, copolymers of vinyl chloride and methyl acrylate, copolymers of vinyl chloride and ethyl acrylate, and combinations thereof. Polyamides include without limitation Nylon 6, Nylon 4-6, Nylon 6-6, Nylon 6-9, Nylon 6-10, Nylon 6-12, Nylon 11, and Nylon 12. Suitable EVOH polymers include copolymers of ethylene and vinyl alcohol having ethylene contents ranging from about 25% to about 50% by mol, including without limitation those having molar ethylene contents of 27%, 29%, 32%, 38%, 44% and 48%. Polyketones are copolymers and terpolymers of olefins and carbon monoxide, including without limitation ethylene-carbon monoxide, propylene-carbon monoxide, ethylene-propylene-carbon monoxide, and the like. Polyketones and polyvinyl chlorides provide both oxygen barrier and moisture barrier, unlike many gas barrier polymers that provide oxygen barrier but little or no moisture barrier.

in addition to or in place of the above-described polyethylene, moisture barrier polymers include without limitation polyolefins such as polypropylene, polybutene, ethylene-alpha olefin copolymers; polyvinyl chlorides (especially polyvinyl dichloride); and polyketones. Polyethylenes include high density polyethylene and branched low density polyethylene. Ethylene-alpha olefin copolymers are copolymers of ethylene and one or more comonomers selected from $C_3$ to $C_{10}$ alpha-olefins. Examples include linear medium density polyethylene, linear low density polyethylene, very low density polyethylene and ultra-low density polyethylene. The most common comonomers are propylene, butene, hexene and octene. The density generally decreases as the amount of comonomer is increased.

Regardless of the oxygen barrier and moisture barrier polymers used in the layers, adhesive tie resins are typically needed to bond the oxygen barrier and moisture barrier layers together, and/or to bond both oxygen barrier and moisture barrier layers to other layers in the cold-stretch oriented blown films and pouches. Adhesive tie resins include without limitation ethylene vinyl acetate, ethylene methyl acrylate, ethylene ethyl acrylate, ethylene methyl methacrylate, ethylene acrylic acid, ethylene methacrylic acid, anhydride-modified polyolefins such as polyethylene, polypropylene and polybutene, anhydride-modified ethylene-alpha olefin copolymers, and ionomers. Elastomers such as styrene-butadiene, styrene-butadiene-styrene, styrene-ethylene-butadiene-styrene, and polycaprolactones can also be used alone or in combination with other adhesive tie polymers to provide enhanced adhesion between adjacent layers.

In one exemplary embodiment, the cold-stretch oriented blown film structure can include the following sequence of layers:

PETG/tie1/tie2/EVOH-1/tie2/EVOH-2/tie2/LLDPE-1/LLDPE-2/tie1/PETG, where PETG is polyethylene terephthalate glycol, EVOH-1 and EVOH-2 are first and second versions of ethylene vinyl alcohol, LLDPE-1 and LLDPE-2 are first and second versions of linear low-density polyethylene. Variations of the foregoing might include multiple layers of selected components as needed. When EVOH is used in any of the film embodiments described herein, the degree of hydrolysis of the EVOH components can range between about 45% and about 85% and is suitably about 50% to about 80%. The EVOH can include about 25% to about 50% mol percent ethylene, suitably about 30% to about 45%. The overall film thickness for any of the film embodiments described herein can be whatever is needed for the particular application, and may, for example, range from about 1 micron to about 500 microns, or about 10 microns to about 250 microns, or about 25 microns to about 100 microns.

While the focus of the invention is to make pouches having the above-described high shrink tension in the pouch transverse direction and minimal or no shrink tension in the pouch longitudinal direction, the shrink properties can also be characterized by the amount of heat shrinkage. The amount of heat shrink can be measured using standard test procedures, including ASTM D2838-18. Using this test, the pouches produced from the cold-stretch oriented multilayer blown film can have a heat shrink of at least about 25% in the pouch transverse direction, or at least about 40% in the pouch transverse direction, or at least about 50% in the pouch transverse direction, or at least about 60% in the pouch transverse direction, or at least about 70% in the pouch transverse direction, or at least about 75% in the pouch transverse direction. The amount of heat shrink in the pouch machine direction can be less than about 10%, or less than about 8%, or less than about 6%, or less than about 4%. The heat shrinkage can be activated by raising the temperature of the pouches to the softening temperature of at least one of the polymer layers and can, in exemplary embodiments, be activated at a temperature of between about 80° C. and about 97° C.

While the embodiments of the invention described herein are exemplary, various modifications and improvements can be made without departing from the spirit and scope of the invention. The scope of the invention is defined by the appended claims and all changes that fall within the meaning and range of equivalents are intended to be embraced therein.

I claim:

1. A process of making transverse shrink pouches, comprising the steps of:
    providing a tubular polymeric blown film having a flattened configuration, an annular configuration, first and second side edges in the flattened configuration, and including multiple polymer layers;
    inflating the tubular polymeric blown film from the flattened configuration to the annular configuration between a first set of nip rollers and a second set of nip rollers, wherein the first set of nip rollers are upstream from the second set of nip rollers;
    either not preheating the tubular polymeric blown film before the tubular polymeric blown film reaches the first set of nip rollers, or preheating the tubular polymeric blown film in a heated fluid bath tank before the tubular polymeric blown film approaches the first set of nip rollers, wherein the first set of nip rollers are positioned at a location outside of and spaced from the heated fluid bath tank;
    cold-stretch orienting the tubular polymeric blown film in a longitudinal direction by 50 percent to 600 percent between the first set of nip rollers and the second set of nip rollers, while limiting stretching and contraction of the tubular polymeric blown film in a transverse direction to zero to less than 10 percent, to form a stretch oriented tubular polymeric blown film;
    collapsing the stretch oriented tubular polymeric blown film from the annular configuration to the flattened configuration using the second set of nip rollers;
    imparting a plurality of transversely extending perforated seals between the first side edge and the second side edge at predetermined intervals along a length of the stretch oriented tubular polymeric blown film in the flattened configuration;
    continuously slitting the stretch oriented blown film in the flattened configuration along the first side edge but not along the second side edge, either before or after the transversely extending perforated seals are imparted, to form individual pouches having an open end corresponding to the first side edge, a closed end corresponding to the second side edge, and opposing sealed pouch edges;
    wherein the individual pouches have a pouch transverse direction extending between the sealed pouch edges, a pouch longitudinal direction extending between the open end and the closed end, a shrink tension of at least 300 psi and up to 1000 psi in the pouch transverse direction, and a shrink tension of zero to less than 150 psi in the pouch longitudinal direction.

2. The process of claim 1, wherein the individual pouches have a shrink tension of at least 400 psi and up to 1000 psi in the pouch transverse direction.

3. The process of claim 1, wherein the individual pouches have a shrink tension of at least 500 psi and up to 1000 psi in the pouch transverse direction.

4. The process of claim 1, wherein the individual pouches have a shrink tension of zero to less than 100 psi in the pouch longitudinal direction.

5. The process of claim 1, wherein the individual pouches have a shrink tension of zero to less than 50 psi in the pouch longitudinal direction.

6. The process of claim 1, wherein the individual pouches have a shrink tension of zero to less than 30 psi in the pouch longitudinal direction.

7. The process of claim 1, wherein the step of preheating the tubular polymeric blown film in the heated fluid bath tank is performed by passing the tubular polymeric blown film in the flattened configuration through a heated fluid bath in the tank.

8. The process of claim 7, wherein:
    the heated fluid bath has a temperature of 30° C. to 95° C.;
    the amount of cold-stretch in the longitudinal direction is 100 percent to 500 percent;
    the stretching or contraction of the tubular polymeric blown film in the transverse direction is limited between zero to less than 6 percent; and
    the shrink tension of the individual pouches is zero to less than 100 psi in the pouch longitudinal direction.

9. The process of claim 8, further comprising contacting the tubular polymeric blown film with a plurality of guide rollers between the first set of nip rollers and the second set of nip rollers, wherein the guide rollers assist in maintaining dimensional stability of the tubular polymeric blown film in the transverse direction while the tubular polymeric blown film is being stretch oriented in the longitudinal direction.

10. The process of claim 1, further comprising steps of filling the individual pouches with a product, sealing the pouches along the open end, and heating the pouches to cause heat shrinkage in the pouch transverse direction.

11. The process of claim 1, further comprising separating the individual pouches from each other along the perforations.

12. The process of claim 1, further comprising contacting the tubular polymeric blown film with a plurality of guide rollers between the first set of nip rollers and the second set of nip rollers, wherein the guide rollers assist in maintaining dimensional stability of the tubular polymeric blown film in the transverse direction while the tubular polymeric blown film is being stretch oriented in the longitudinal direction.

13. A process of making transverse shrink pouches, comprising the steps of:
    providing a tubular polymeric blown film having a flattened configuration, an annular configuration, first and second side edges in the flattened configuration, and including multiple polymer layers;

cold-stretch orienting the tubular polymeric blown film in a longitudinal direction by 100 percent to 500 percent between a first set of nip rollers and a second set of nip rollers, while limiting stretching and contraction of the tubular polymeric blown film in a transverse direction to zero to less than 8 percent, wherein the first set of nip rollers are upstream of the second set of nip rollers;

either not preheating the tubular polymeric blown film before the tubular polymeric blown film reaches the first set of nip rollers, or preheating the tubular polymeric blown film in a heated fluid bath tank before the tubular polymeric blown film approaches the first set of nip rollers, wherein the first set of nip rollers are positioned at a location outside of and spaced from the heated fluid bath tank;

collapsing the stretch oriented tubular polymeric blown film from the annular configuration to the flattened configuration using the second set of nip rollers;

imparting a plurality of transversely extending perforated seals between the first side edge and the second side edge at predetermined intervals along a length of the stretch oriented tubular polymeric film in the flattened configuration;

continuously slitting the stretch oriented blown film in the flattened configuration along the first side edge but not along the second side edge, either before or after the transversely extending perforated seals are imparted, to form individual pouches having an open end corresponding to the first side edge, a closed end corresponding to the second side edge, and opposing sealed pouch edges;

wherein the individual pouches have a pouch transverse direction extending between the sealed pouch edges, a pouch longitudinal direction extending between the open end and the closed end, a shrink tension of at least 300 psi and up to 1000 psi in the pouch transverse direction, and a shrink tension of zero to less than 100 psi in the pouch longitudinal direction.

14. The process of claim 13, wherein the individual pouches have a shrink tension of at least 400 psi and up to 1000 psi in the pouch transverse direction.

15. The process of claim 13, wherein the individual pouches have a shrink tension of at least 500 psi and up to 1000 psi in the pouch transverse direction.

16. The process of claim 13, wherein the individual pouches have a shrink tension of zero to less than 50 psi in the pouch longitudinal direction.

17. The process of claim 13, wherein the individual pouches have a shrink tension of zero to less than 30 psi in the pouch longitudinal direction.

18. The process of claim 13, further comprising contacting the tubular polymeric blown film with a plurality of guide rollers between the first set of nip rollers and the second set of nip rollers, wherein the guide rollers assist in maintaining dimensional stability of the tubular polymeric blown film in the transverse direction while the tubular polymeric blown film is being stretch oriented in the longitudinal direction.

19. The process of claim 13, further comprising steps of filling the individual pouches with a product, sealing the pouches along the open end, and heating the pouches to cause heat shrinkage in the pouch transverse direction.

* * * * *